United States Patent [19]

West

[11] 4,125,412

[45] Nov. 14, 1978

[54] PROCESS FOR THE PRODUCTION OF DURABLE TITANIUM DIOXIDE PIGMENT

[75] Inventor: William A. West, Newark, Del.

[73] Assignee: E. I. Du Pont de Nemours and Company, Wilmington, Del.

[21] Appl. No.: 721,869

[22] Filed: Sep. 9, 1976

[51] Int. Cl.$^2$ .............................................. C09C 1/36
[52] U.S. Cl. ................................. 106/300; 106/308 B
[58] Field of Search ............................ 106/300, 308 B

[56] References Cited

U.S. PATENT DOCUMENTS

| | | | |
|---|---|---|---|
| 3,437,502 | 4/1969 | Werner | 106/300 |
| 3,510,335 | 5/1970 | McGinnis | 106/300 |
| 3,591,398 | 7/1971 | Angerman | 106/300 |
| 3,649,322 | 3/1972 | Foss | 106/308 B |
| 3,928,057 | 12/1975 | DeColibul | 106/300 |

*Primary Examiner*—Winston A. Douglas
*Assistant Examiner*—J. V. Howard

[57] ABSTRACT

Titanium dioxide pigments possessing outstanding durability are prepared by a wet coating treatment in which the temperature of the slurry, pH of the slurry and addition of coating materials are carefully controlled to reduce treatment time thereby increasing throughput capability.

10 Claims, No Drawings

PROCESS FOR THE PRODUCTION OF DURABLE TITANIUM DIOXIDE PIGMENT

BACKGROUND OF THE INVENTION

This invention relates to an improved process of preparing $TiO_2$ pigments which are stable, when dispersed in polymeric carriers, to heat, light and chemical attack.

Titanium dioxide pigments in various forms have been, for decades, the principal white pigment of world commerce.

For example, in the U.S. alone annual shipments of $TiO_2$ pigments have exceeded 1.2 billion pounds throughout this decade, and projections of shipments in 1980 range from a low projection of 1.8 billion pounds to a high projection of 2.5 billion pounds. With this amount of product throughput it will be understood that seemingly small changes in process operating efficiency will have a favorable impact on energy and capital requirements of the $TiO_2$ manufacturers if they are to meet the needs of the marketplace.

$TiO_2$ pigments are used in a number of end-use applications, but the most demanding end-use application from the standpoint of product integrity are outdoor paint systems and plastics processed at high temperatures. $TiO_2$ pigments employed in such applications must possess outstanding durability in addition to opacity, hiding power, and dispersibility. Such durable $TiO_2$ pigments at present account for more than 50,000 tons of volume of annual usage and require far more time and investment than grades produced for less demanding applications.

It is known, although the mechanism is not fully understood, that paint films containing $TiO_2$ are degraded via a photochemical reaction. This degradation in outdoor paints results in breakdown of the films which is commonly known as chalking.

It is also known that pigmented thermoplastic shapes when processed at elevated temperatures tend to discolor when untreated $TiO_2$ is employed as the pigment.

One successful solution to overcome this deficiency of $TiO_2$ as a pigment when outstanding durability is a requirement has been to coat the pigment particle with a dense amorphous shell of silica. Originally silica gel was deposited on $TiO_2$ particles and the resultant coated pigment was calcined to convert the silica into a durable coating.

In 1959 U.S. Pat. No. 2,885,366 issued to Ralph K. Iler in which it was taught that active silica could be deposited as a skin of impenetrable amorphous silica upon a number of substrates without the need for calcination.

In 1973 U.S. Pat. No. Re. 27,818 issued to Alfred J. Werner in which it was taught that a $TiO_2$ pigment with outstanding durability, gloss, opacity and dispersibility could be prepared when not only a dense skin of amorphous silica was used but also when alumina was added as a second treatment.

The ability to produce durable pigments in required volume to satisfy a growing market need requires substantial capital investment if currently available technology is to be used for each of the known methods for producing a pigment of high durability and requires long treatment times. The subject invention will allow a $TiO_2$ manufacturer to greatly forshorten the treatment time and thereby increase product throughput without the need for expensive capital improvements.

SUMMARY OF THE INVENTION

In a process for preparing durable titanium dioxide pigment by depositing a dense silica coating followed by alumina deposition the improvement which comprises maintaining the $TiO_2$ slurry at a temperature of from 80° to 100° C. during the silica deposition, optionally adjusting the slurry to a pH of from 9 to 10.5, rapidly adding sufficient sodium silicate to provide from 1.5 to 15% silica, based upon the $TiO_2$, as a dense, amorphous, substantially continuous coating upon the $TiO_2$, adjusting the slurry to a pH of from 9 to 10.5 and maintaining the temperature and pH of the slurry for from 15 to 60 minutes, rapidly adding sodium aluminate and acid simultaneously to the slurry while maintaining the pH from 7 to 9.

DESCRIPTION OF THE INVENTION

This invention relates to improvements in a process for preparing premium quality titanium dioxide pigments that possess outstanding chalk resistance, excellent dispersibility and outstanding tint retention when employed in paint formulations. This means that the pigment produced by the process of this invention is suitable for use in industrial, automotive and trade sales finishes where outstanding durability, dispersibility, gloss, tint retention and nonchalking are essential to a successful product. The pigments produced using the process of this invention are also suitable for use in plastics where thermal treatment or outdoor exposure dictates a pigment that resists yellowing or weathering be used. The products of this invention are also suitable for use in high performance inks when chalk resistance and brightness retention in high bake metal decorating ink applications is required.

As indicated above, $TiO_2$ pigments possessing the above desirable properties can be prepared following the teaching of Werner's U.S. Pat. No. Re. 27,818; however, the process as disclosed therein is time-consuming and as a result may restrict plant throughput. The process of this invention is an improvement in the Werner process which improvement was made possible as a result of a discovery that control of various reaction parameters within critical limits would enable a durable $TiO_2$ pigment possessing the necessary end-use properties to be prepared in but a fraction of the time taught as essential by Werner.

By following the procedure outlined in this patent a completely continuous process is feasible. The process as described by Werner requires the addition of acid after adding sodium silicate to slowly lower pH over a period of two hours for a 6% silica coating. To make this a continuous process would require a pipeline 1400 feet long with multiple acid addition points if the slurry velocity were two feet per second. With the procedure described herein the sodium silicate can be added continuously in a pipeline, acid added continuously to a tank with an average hold time of only one-half hour and the sodium aluminate and acid added in a pipeline which leads directly to the filter.

To achieve the desired results control of temperature, time and pH of the reaction medium during silica deposition is essential. Further, following silica deposition control of reaction system pH to allow rapid precipitation of alumina is also required.

Due to the nature of this process, products of as broad a range as taught by Werner cannot practically be prepared; however, within a limited range products with the outstanding properties set out above may be prepared.

In the process of this invention an aqueous slurry of $TiO_2$ is maintained at a temperature of between 80° and 100° C. during the deposition of silica. Preferably, the temperature of the slurry will be maintained between 85° and 95° C.

The silica source is sodium silicate and is rapidly added to the $TiO_2$ slurry. Such addition is preferably made in a pipeline and in a zone of turbulence. However, when conventional equipment is available such equipment may be used if the pH of the $TiO_2$ slurry is adjusted to a pH of from 9-10.5 prior to the addition of the silica.

After silica has been added, in the form of sodium silicate, the pH is adjusted to pH of from 7 to 10.5 and cured. Cure time will range from 60 minutes at a temperature of 80° C. and pH 9 to 15 minutes at a temperature of 100° C. and a pH of 10.5. In general, the lower the temperature the higher the pH required to achieve an impervious silica coating. On the other hand, too high a pH, i.e., above 11 during the cure, will result in only a partial deposition because of the higher silica solubility. The essence of this step in my process is that the silica sees the titania at a pH between 9 and 10.5 for at least 15 minutes. The exaxt time will, as explained above, be dependent on the pH and temperature of the system, but even at a uniform pH of 9 and temperature of 80° C. no more than 60 minutes is required before the next step in the process is begun.

Following the silica cure sodium aluminate and an acid such as HCl or $H_2SO_4$ are added simultaneously to maintain the pH of the slurry at about 8. The slurry can then be filtered, but preferably will be adjusted, to pH of 7 before filtering and then drying.

In the process of this invention from about 1.5% to about 15% silica is deposited as a dense, amorphous, continuous coating on the $TiO_2$, preferably from about 1.5% to 6% silica is deposited.

In the process of this invention from about 1.5 to about 5% of alumina with 2 to 3% of alumina being preferred is deposited on the silica treated pigment. As is apparent from the above, the products produced according to the process of this invention comprise a $TiO_2$ core, amorphous silica skin and deposited alumina.

The $TiO_2$ pigment treated according to this invention is preferably formed by oxidation of titanium tetrachloride at high temperatures. The core material useful in the practice of U.S. Pat. No. Re. 27,818 is also useful in the practice of this invention and the disclosure of U.S. Pat. No. Re. 27,818 in this regard is herein incorporated by reference.

As mentioned above, the silica coating on the $TiO_2$ must be dense, amorphous and continuous rather than porous and discontinuous. This silica coating is primarily responsible for the durability of the finished titanium dioxide; however, coating without an alumina treatment has been seen to reduce gloss, dispersibility and hiding power. Therefore, the alumina treatment described above is essential to a commerically useful pigment.

The coating of dense, amorphous silica can be identified according to the following techniques: electron micrographs, acid solubility, SIMS and ESCA.

Electron micrographs are useful in determining whether a good coating is achieved, primarily by observing the amount of debris present. A good coating will be apparent as a result of a lack of debris.

SIMS, secondary ion mass spectroscopy, is a very surface sensitive tool, analyzing the top atomic layer or two. The sample, in vacuum, is bombarded by inert gas ions. The inert gas ions dislodge atomic/molecular size chunks from the surface of the sample. Those ejected fragments which are properly signed ions are accelerated into a mass spectrometer where their e/m (charge to mass ratio) is measured. Continued sputtering etches into the bulk of the sample and elemental analysis of the fragments give component concentration as a function of depth.

ESCA, electron spectroscopy for chemical analysis, is a tool employed to determine the elemental analysis of surface layers of approximately 10 to 40 Å in thickness.

The sample, in a vacuum chamber, is bombarded by low energy X-rays resulting in the ejection of photoelectrons. The energy of the photoelectrons is characteristic of the particular elements present in the sample and may give some information about the bonding of the element.

The depth of the analysis is determined by the photoelectrons which escape. The X-rays penetrate the sample deeply and generate photoelectrons within the bulk of the sample, but only those photoelectrons originating near the surface have any significant probability of escape before being captured by the matrix.

Acid Solubility of the coated $TiO_2$ pigment is a measure of how uniformly the dense silica skin has been deposited. A loose silica deposit which does not coat the $TiO_2$ surface will result in a high acid solubility whereas a uniform dense coating will decrease the solubility down to a few percent. Untreated $TiO_2$ has an acid solubility of 30 to 35 percent.

Acid solubility of the coated $TiO_2$ pigments of this invention is measured by digesting a predetermined quantity of coated pigment in sulfuric acid and spectrophotometrically comparing it to a standard $TiO_2$ sample similarly treated. The standard spectrophotometric curve is prepared as follows: a standard solution is prepared by dissolving 15 g. of ammonium sulfate and 1.0118 g. of $TiO_2$, containing 98.83% by weight $TiO_2$, in 20 ml. of 66° Be. sulfuric acid and diluting to 800 ml. with water. Eighty milliliters of the sulfuric acid solution is then added to this solution. After allowing the resulting solution to cool to room temperature, it is diluted to one liter with water. The solution contains 0.001 g. of $TiO_2$ per ml. and should be allowed to stand for one week before using.

Samples of 2, 4, 6 and 8 ml. of the above-prepared standard solution are each mixed with 10 ml. of 30% hydrogen peroxide and diluted to 100 ml. with 10% sulfuric acid. After standing for one hour, the absorbance of these solutions is read using a Beckman Model DK, DU or B spectrophotometer against a reference solution, prepared by diluting 10 ml. of 30% hydrogen peroxide to 100 ml. with 10% sulfuric acid at 400 m$\mu$ using 100 mm. cells. A plot of titanium peroxide concentration in mg./l. optical density is made for these samples.

To determine acid solubility of the coated TiO$_2$ pigments, 0.2000 g. of coated TiO$_2$ pigment is added with stirring to 10 ml. 66° Be. sulfuric acid at 175° C. The pigment is digested at 175° C. for 1 hour. After digestion the sample is quenched by pouring into crushed ice, made from distilled water. The sample is diluted to 100 ml. with water and filtered. Ten milliliters of the filtrate is mixed with 2 ml. of 30% hydrogen peroxide and diluted to 25 ml. with 10% sulfuric acid. After one hour the absorbence of the sample is read against a reference solution, prepared by diluting 2 ml. of 30% hydrogen peroxide to 25 ml. with 10% sulfuric acid.

The concentration of soluble TiO$_2$ is determined from the above-prepared standard spectrophotometric curve from the measured optical density and the percent soluble TiO$_2$ i.e., the acid solubility, is calculated by dividing the concentration of soluble TiO$_2$ by 8.

From one or more of the above techniques it will be seen that when the process of this invention is followed all or essentially all of the silica has been deposited as a coating upon the titanium dioxide core material as dense, amorphous silica. Should much free silica gel be present the viscosity of the slurry could be adversely affected.

The invention will be better understood by reference to the following examples, in which parts and percentages are by weight.

EXAMPLE 1

One thousand parts of TiO$_2$ containing 1% cooxidized alumina is slurried in sufficient water to give a concentration ratio of 450 grams per liter and is heated to give a temperature of 100° C. The pH of the slurry is highly acidic and is adjusted to 10. Then 100 ml. of sodium silicate as a 400 g./l. solution, equivalent to 4% SiO$_2$, and sufficient HCl is added to the slurry as fast as practical to achieve a pH of 9. Following the addition of the sodium silicate the slurry is maintained at a pH of 9 and a temperature of 100° C. for 6 minutes.

The pH of the slurry is then adjusted to 8. Then 57.1 ml. sodium aluminate containing 350 g./l. of Al$_2$O$_3$ and HCl are added simultaneously while maintaining a pH of about 8. The resulting slurry is cured at 100° C. for 30 minutes. The pH of the slurry is then adjusted to 7 with hydrochloric acid, is washed on a Buchner funnel, washed with distilled water to a filtrate resistance of 7,000 ohms, dried and ground in the conventional manner.

The pigment is highly dispersible and has an acid solubility of 2.3.

EXAMPLES 2-7

The procedure described in Example 1 is repeated but the relationship between pH, time and temperature during the silica addition are varied as indicated. The alumina addition is carried out as described. The acid solubility of the resulting pigment is also indicated.

| Example | Slurry pH | Cure Time | Cure Temp. | Acid Solubility |
|---|---|---|---|---|
| 2 | 9.5 | 60 | 100° C. | 2.2 |
| 3 | 9.5 | 60 | 80° C. | 2.9 |
| 4 | 9.5 | 30 | 90° C. | 3.0 |
| 5 | 9.5 | 30 | 80° C. | 5.2 |
| 6 | 10.0 | 30 | 80° C. | 2.4 |
| 7 | 10.5 | 30 | 80° C. | 2.5 |

The pigment prepared according to Example 6 is analyzed by the ESCA technique and is compared with a sample prepared according to the teaching of Werner in which 6% by weight of silica is added. These surface analysis data show:

| Pigment of | Silica Added | Surface Wt. % Calculated as | | |
|---|---|---|---|---|
| | | TiO$_2$ | Al$_2$O$_3$ | SiO$_2$ |
| Example 6 | 4% | 6 | 32 | 62 |
| Werner | 6% | 6 | 35 | 60 |

As is seen above the process of this invention produces a silica coated pigment equivalent to prior art pigment in one-fourth the time following silica addition.

EXAMPLE 8

One thousand parts of TiO$_2$ containing about 1% cooxidized alumina is slurried in sufficient water to give a concentration of 450 grams per liter. The pH of the slurry is adjusted to 10.0 with caustic. The slurry is heated to 80° C. and sufficient sodium silicate as a 400 g./l. solution, equivalent to 4% SiO$_2$, is rapidly added. Sufficient hydrochloric acid is added to assure a final slurry pH of 10.0. After silica addition the slurry is cured, with agitation, at 80° C. for 30 minutes. The alumina is added as described in Example 1 and the slurry is filtered, dried and ground as in Example 1. The acid solubility of the pigment produced is 2.4.

EXAMPLES 9-12

The procedure described in Example 8 is repeated but the slurry pH, temperature and cure time are varied as indicated below. The acid solubility of the resultant pigment was determined prior to grinding.

| Example | Slurry pH | Cure Time | Cure Temp. | Acid Solubility |
|---|---|---|---|---|
| 9 | 10.0 | 15 | 80° C. | 3.4 |
| 10 | 10.0 | 20 | 80° C. | 3.4 |
| 11 | 10.0 | 25 | 80° C. | 2.9 |
| 12 | 10.0 | 30 | 80° C. | 1.8 |

EXAMPLE 13

Forty-five tons of TiO$_2$ containing about 1% cooxidized alumina is slurried in sufficient water to give a concentration of about 450 grams per liter. The pH of the initial slurry is pH 3.7 and is heated to a temperature of 90° C. while collecting. The pH of the slurry is then adjusted to a pH of from 10.0 to 10.5 with 50% sodium hydroxide. Sufficient sodium silicate solution of 400 grams per liter SiO$_2$ content, equivalent to 6% silica on a TiO$_2$ basis, is rapidly added. The pH of the slurry is then adjusted to 10.0-10.5 with concentrated sulfuric acid. The slurry is then cured at 90° C. for 30 minutes and additional sulfuric acid is added to bring the pH of the slurry to about pH 7.5.

Then sufficient sodium aluminate, equivalent to 2% alumina, is added while maintaining the pH of the slurry at about 8. During this procedure care should be exercised that the pH of the slurry does not fall below 7.0 or go above 9.0. H$_2$SO$_4$ is used for this purpose. The pH is then adjusted with H$_2$SO$_4$ to a pH of 7 whereupon the slurry is filtered, washed, dried and ground.

The pigment is readily dispersed and has an acid solubility of 3.4.

EXAMPLE 14

An aqueous slurry of 450 grams/liter $TiO_2$ containing 1% co-oxidized alumina at a pH of 3.7 is fed continuously through a pipeline at a rate of 200 pounds of $TiO_2$ per minute. It is heated by steam to 90° C. and a solution of sodium silicate containing 400 grams per liter of $SiO_2$ is added through a pipeline mixer at a rate of 3.6 gallons per minute (equivalent to 6% $SiO_2$ on a $TiO_2$ basis). The slurry is fed continuously to a tank of about 1800 gallons capacity where acid is added to maintain a pH of 10. To the slurry flowing from the tank is added 1.37 gallons per minute of sodium aluminate containing 350 grams per liter of $Al_2O_3$ (2% $Al_2O_3$ on a $TiO_2$ basis) and sufficient acid to maintain a pH of about 8. To facilitate mixing the additions are made through a pipeline mixer. The pigment in the slurry has a acid solubility of 3.2% and the slurry is then continuously filtered, washed, dried and ground. The finished pigment is readily dispersible, and has good gloss.

What is claimed is:

1. In a process for preparing durable titanium dioxide pigment by depositing in a slurry of $TiO_2$ a dense silica coating upon said $TiO_2$ followed by precipitating alumina into said slurry, the improvement which comprises:
   A. maintaining the $TiO_2$ slurry at a temperature of from 80° C. to 100° C. during the silica deposition,
   B. adjusting the slurry to a pH of from 9 to 10.5,
   C. rapidly adding sufficient sodium silicate to provide from 1.5 to 15% silica, based upon the $TiO_2$, as a dense, amorphous, substantially continuous coating upon the $TiO_2$,
   D. adjusting the pH of the slurry to from 9 to 10.5 and maintaining said pH at a temperature of from 80° C. to 100° C. for from 15 to 60 minutes,
   E. adjusting the slurry to a pH of about 8,
   F. rapidly adding sodium aluminate and acid simultaneously to the slurry while maintaining the pH of the slurry from 7 to 9, and
   G. filtering, washing and drying the treated $TiO_2$.

2. The process of claim 1 in which the slurry is maintained at a temperature of from 85° C. to 95° C. and the pH is from 9 to 10.5 for from 30 to 60 minutes following silica addition.

3. The process of claim 1 in which the acid employed is selected from the group consisting of HCl and $H_2SO_4$.

4. In a process for preparing durable titanium dioxide pigment by depositing in a slurry of $TiO_2$ a dense silica coating upon said $TiO_2$ followed by precipitating alumina into said slurry, the improvement which comprises:
   A. heating and maintaining the $TiO_2$ slurry at a temperature of from 80° C. to 100° C.,
   B. rapidly adding sufficient sodium silicate to provide from 1.5 to 8% silica, based upon the $TiO_2$, as a dense, amorphous, substantially continuous coating upon the $TiO_2$,
   C. adjusting the pH of the slurry to from 9 to 10.5 and maintaining said adjusted slurry at a temperature of from 85° C. to 95° C. for from 15 to 60 minutes,
   D. rapidly and simultaneously adding sodium aluminate and an acid selected from the group consisting of HCl and $H_2SO_4$, said sodium aluminate and acid being in proportion to maintain the slurry at a pH of from 8 to 9,
   E. curing the slurry for up to 30 minutes, and
   F. adjusting the slurry to pH 7 and filtering, washing and drying.

5. In a process for preparing durable titanium dioxide pigment by depositing in a slurry of $TiO_2$ a dense silica coating upon said $TiO_2$ followed by precipitating alumina into said slurry, the improvement which comprises:
   A. maintaining the $TiO_2$ slurry at a temperature of from 80° C. to 100° C. during the silica deposition,
   B. adjusting the slurry to a pH of from 9 to 10.5,
   C. rapidly adding sufficient sodium silicate to provide from 1.5 to 15% silica, based upon the $TiO_2$, as a dense, amorphous, substantially continuous coating upon the $TiO_2$,
   D. adjusting the pH of the slurry to from 9 to 10.5 and maintaining said pH at a temperature of from 80° C. to 100° C. for from 15 to 60 minutes,
   E. rapidly adding sodium aluminate and acid simultaneously to the slurry while maintaining the pH of the slurry from 7 to 9, and
   F. filtering, washing and drying the treated $TiO_2$.

6. The process of claim 5 in which the slurry is maintained at a temperature of from 85° C. to 95° C. and the pH is from 9 to 10.5 for from 30 to 60 minutes following silica addition.

7. The process of claim 5 in which the acid employed is selected from the group consisting of HCl and $H_2SO_4$.

8. In a process for preparing durable titanium dioxide pigment by depositing in a slurry of $TiO_2$ a dense silica coating upon said $TiO_2$ followed by precipitating alumina into said slurry, the improvement which comprises:
   A. maintaining the $TiO_2$ slurry at a temperature of from 80° C. to 100° C. during the silica deposition,
   B. rapidly adding sufficient sodium silicate to provide from 1.5 to 15% silica, based upon the $TiO_2$, as a dense, amorphous substantially continuous coating upon the $TiO_2$,
   C. adjusting the pH of the slurry to from 9 to 10.5 and maintaining said pH at a temperature of from 80° C. to 100° C. for from 15 to 60 minutes,
   D. rapidly adding sodium aluminate and acid simultaneously to the slurry while maintaining the pH of the slurry from 7 to 9, and
   E. filtering, washing and drying the treated $TiO_2$.

9. The process of claim 8 in which the slurry is maintained at a temperature of from 85° C. to 95° C. and the pH is from 9 to 10.5 for from 30 to 60 minutes following silica addition.

10. The process of claim 8 in which the acid employed is selected from the group consisting of HCl and $H_2SO_4$.

* * * * *